United States Patent
Batrinu et al.

(10) Patent No.: US 12,411,578 B2
(45) Date of Patent: Sep. 9, 2025

(54) ULTRASONIC TOUCH SENSOR WITH WATER DETECTION

(71) Applicant: Infineon Technologies AG, Neubiberg (DE)

(72) Inventors: Costin Batrinu, Bucharest (RO); Vasyl Mandziy, Schyrets (UA); Gheorghe-Iulian Chivu, Targoviste (RO); Victor-Valentin Mocanu, Braila (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/530,440

(22) Filed: Dec. 6, 2023

(65) Prior Publication Data

US 2025/0190077 A1      Jun. 12, 2025

(51) Int. Cl.
*G06F 3/041*      (2006.01)
*G06F 3/043*      (2006.01)

(52) U.S. Cl.
CPC ........ *G06F 3/04186* (2019.05); *G06F 3/0436* (2013.01)

(58) Field of Classification Search
CPC .... G06F 18/2178; G06F 18/217; G06F 18/25; G06F 17/18; G06F 2203/04106; G06F 3/043; G06F 21/32; G06F 3/0436; G06F 3/0433; H04B 17/318; H04B 17/26; H04B 17/309; G06G 3/04186; G06G 3/0436; G06G 3/043; G06G 3/0433
See application file for complete search history.

(56) References Cited

U.S. PATENT DOCUMENTS

| | | | | |
|---|---|---|---|---|
| 6,279,396 | B1 * | 8/2001 | Imagawa | G01S 7/529 73/1.79 |
| 2016/0345113 | A1 * | 11/2016 | Lee | G01S 15/04 |
| 2018/0307375 | A1 * | 10/2018 | Shah | G06F 3/04186 |
| 2019/0354238 | A1 * | 11/2019 | Akhbari | G06F 3/0436 |
| 2020/0309930 | A1 * | 10/2020 | Zhou | G01S 15/86 |
| 2021/0278926 | A1 | 9/2021 | Akhbari et al. | |
| 2021/0405809 | A1 | 12/2021 | Khajeh et al. | |
| 2022/0412820 | A1 * | 12/2022 | Severac | H03K 17/962 |

FOREIGN PATENT DOCUMENTS

| | | |
|---|---|---|
| CN | 115729376 A | 3/2023 |
| JP | 2016212678 A | 12/2016 |

* cited by examiner

*Primary Examiner* — Sujit Shah
(74) *Attorney, Agent, or Firm* — Harrity & Harrity, LLP

(57) ABSTRACT

An ultrasonic touch sensor includes a touch structure comprising a touch surface configured to receive a touch; an ultrasonic transmitter configured to transmit at least one ultrasonic transmit wave toward the touch structure; an ultrasonic receiver configured to receive ultrasonic reflected waves produced by a plurality of reflections of the at least one ultrasonic transmit wave and generate a measurement signal representative of the ultrasonic reflected waves; and a measurement circuit configurable in a first operation mode corresponding to an air environment and a second operation mode corresponding to a wet environment. The measurement circuit is configured to calculate a rate of change of a plurality of samples of the measurement signal, perform a first comparison based on the rate of change and a rate of change threshold, and operate in the second operation mode based on the rate of change satisfying the rate of change threshold.

20 Claims, 9 Drawing Sheets

ULTRASONIC TOUCH SENSOR WITH WATER DETECTION

BACKGROUND

Touch sensing through metal surfaces using ultrasound waves is currently being investigated as an alternative to capacitive touch sensing. Ultrasonic sensing relies on a transmission of an ultrasound wave directed at a touch structure, and reception and processing of a reflected waveform that is reflected back from the touch structure. A characteristic of the reflected waveform will depend on an existence or a non-existence of a touch event, and can be used to discriminate between the existence or the non-existence of the touch event.

SUMMARY

In some implementations, an ultrasonic touch sensor includes a housing having a package cavity; a touch structure comprising a touch surface configured to receive a touch, wherein the touch structure is coupled to the housing and arranged over the package cavity, and wherein the touch structure comprises a touch interface at the touch surface; an ultrasonic transmitter arranged within the package cavity, wherein the ultrasonic transmitter is configured to transmit at least one ultrasonic transmit wave toward the touch structure; an ultrasonic receiver arranged within the package cavity, wherein the ultrasonic receiver is configured to receive ultrasonic reflected waves produced by a plurality of reflections of the at least one ultrasonic transmit wave and generate a measurement signal representative of the ultrasonic reflected waves; and a measurement circuit arranged within the package cavity and coupled to the ultrasonic receiver, wherein the measurement circuit is configurable in a first operation mode corresponding to an air environment and a second operation mode corresponding to a wet environment, and wherein the measurement circuit is configured to acquire a first plurality of samples of the measurement signal, calculate a rate of change of the first plurality of samples, perform a first comparison based on the rate of change and a rate of change threshold, and operate in the second operation mode based on the rate of change satisfying the rate of change threshold.

In some implementations, a method of operating an ultrasonic touch sensor includes transmitting an ultrasonic transmit wave toward a touch structure of the ultrasonic touch sensor; generating a measurement signal representative of ultrasonic reflected waves produced by a plurality of reflections of the ultrasonic transmit wave; acquiring a plurality of samples of the measurement signal; calculating a rate of change of the plurality of samples; performing a comparison based on the rate of change and a rate of change threshold; and operating the ultrasonic touch sensor in a water operation mode based on the rate of change satisfying the rate of change threshold, or operating the ultrasonic touch sensor in an air operation mode based on the rate of change not satisfying the rate of change threshold.

BRIEF DESCRIPTION OF THE DRAWINGS

Implementations are described herein with reference to the appended drawings.

DETAILED DESCRIPTION

Figure 1:
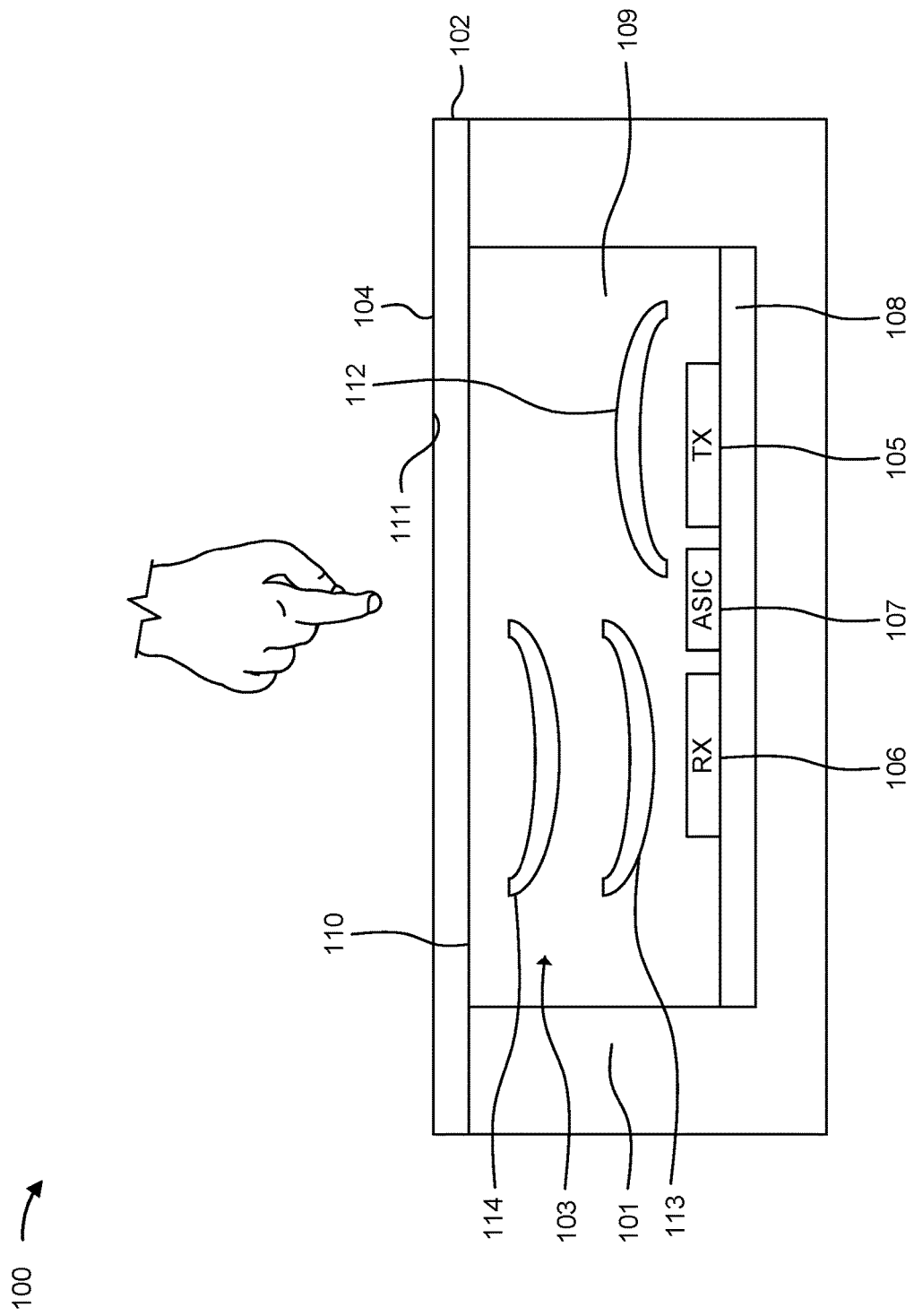
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). For a capacitive touch sensor, the property to be measured is a capacitance that is detected directly from a user making skin contact with a touch structure. For example, a conductive material may be coated on a non-touch side of the touch structure and a capacitor may be formed within the touch structure (e.g., between the conductive material disposed on the non-touch side and a touch side) when skin contact is made to the touch side of the touch structure. The capacitive touch sensor may measure a capacitance within the touch structure and detect changes in the capacitance for detecting touches. However, capacitive touch sensors are prone to false signals (e.g., false touch detections) and cannot operate reliably, if at all, when the touch surface is exposed to water. Thus, there is an interruption in touch detection functionality when the capacitive touch sensor is wet or submerged in water or another liquid. Because the capacitive touch sensor cannot operate correctly in a reliable manner when the touch surface is wet or submerged in water, a user is not able to properly interact with the capacitive touch sensor when the touch surface is wet or submerged in water.

For an ultrasonic touch sensor, the property to be measured is an ultrasound wave produced, for example, by a microelectromechanical system (MEMS) transducer. The ultrasound wave may be directed at a touch structure, where the ultrasound wave is reflected back by the touch structure as a reflected ultrasound wave. The reflected ultrasound wave can be used for sensing touch (e.g., a touch event) at a touch surface of the touch structure. Specifically, the ultrasonic touch sensor can use the reflected ultrasound wave to discriminate between an existence of the touch event or a non-existence of the touch event (e.g., a no-touch event).

Some implementations disclosed herein are directed to using an ultrasonic touch sensor to discriminate between touch and no touch events, even when submerged in water or another liquid. The ultrasonic touch sensor may use capacitive micromachined ultrasonic transducers (CMUTs) as sensor elements to make touch/no-touch decisions when a touch surface of the ultrasonic touch sensor is exposed to air (e.g., when not in contact with a liquid) and to make touch/no-touch decisions when the touch surface of the ultrasonic touch sensor is in contact with or otherwise exposed to a liquid. The CMUTs use ultrasound waves as a basis for the touch/no-touch decision.

In some implementations, the ultrasonic touch sensor may use a single transceiver CMUT or a single pair of CMUTS, with one CMUT configured as a transmitter and another CMUT configured as a receiver, for discriminating between an air environment and a wet environment at the touch surface (e.g., discriminating between dry material and wet material) and configuring the ultrasonic touch sensor into a first operation mode corresponding to the air environment or a second operation mode corresponding to the wet environment. In other words, the ultrasonic touch sensor may be configurable for detecting dry touches or for detecting wet touches at the touch surface. In some implementations, the ultrasonic touch sensor may use a same measurement signal that is used for discriminating between the air environment and the wet environment for making a touch/no-touch decision.

For example, any type of water contact at the touch surface creates a rapid change in a signal amplitude of a reflected ultrasonic wave measured by the ultrasonic touch sensor. A valid touch that occurs in the air environment also results in a change in a single amplitude of the reflected ultrasonic wave measured by the ultrasonic touch sensor. However, a transition in signal amplitude as a result of water making contact with the touch surface is much faster than a transition in signal amplitude as a result of the valid touch at the touch surface in the air environment. Thus, the ultrasonic touch sensor may monitor a measurement signal produced by reflected ultrasonic waves and enable the second operation mode when a rate of change in the measurement signal satisfies (e.g., exceeds) a threshold. Otherwise, when the rate of change in the measurement signal does not satisfy the threshold, the ultrasonic touch sensor may remain in the first operation mode. The ultrasonic touch sensor may use different thresholds and/or signal processing techniques for making a touch/no-touch decision depending on whether operating in the first operation mode or the second operation mode.

In some implementations, a Euclidean distance of the measurement signal relative to a reference signal can be continuously monitored in order to determine when a rapid transition occurs due to water making contact with the touch surface, thus allowing for an invalidation of a false touch detection and causing the ultrasonic touch sensor to be configured into the second operation mode in order to handle touch detection with water being present at the touch surface.

In some implementations, the ultrasonic touch sensor can detect and/or reject water contact while still performing its primary role as a touch sensor. Thus, the ultrasonic touch sensor includes a water detection mechanism for ensuring robust touch detection, even when water is present on the touch surface.

In some implementations, the ultrasonic touch sensor can detect direct touches (skin contact) and indirect touches while the touch surface is exposed to a liquid.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. An area of the housing in which ultrasonic transducers reside may be referred to as an acoustic port, an ultrasound port, an acoustic chamber, or an ultrasound chamber, among other examples.

The touch structure 102 may be used as a lid or a package cover that rests upon a touch side of the ultrasonic touch sensor 100. In the example shown, the ultrasound chamber 103 is an internal area or a package cavity that is formed by the enclosure of the frame 101 and the touch structure 102. The touch structure 102 may be made of one or more metal layers, one or more plastic layers, and/or one or more layers of another solid material. Thus, the touch structure 102 may be a covering coupled to the frame 101, and the ultrasound chamber 103 may be an internal area that is defined, at least in part, by the touch structure 102 (e.g., an internal area defined between the frame 101 and the touch structure 102). The touch structure 102 includes a touch surface 104 at the touch structure's external interface with an environment. The touch surface 104 is arranged and operable to receive contact (e.g., touches) from a user that can be detected by sensor circuitry.

In some implementations, lateral sides of the frame 101 may be at least partially open, such that the ultrasound chamber 103 is not a fully enclosed volume. For example, the lateral sides of the frame 101 may include columns that support the touch structure 102, and/or the touch structure 102 may be supported by a coupling medium, such as a film layer, a silicone gel, or a soft epoxy. For example, the coupling medium may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases in which the lateral sides of the ultrasound chamber 103 are fully open.

The ultrasound chamber 103 contains sensor circuitry used for detecting no-touch events and touch events at the touch surface 104. A touch event is an instance when a user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves to detect no-touch events and touch events by applying a first touch detection algorithm, and to control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs). In some implementations, the transmitter 105 and the receiver 106 may be combined into a single transceiver transducer that has a single flexible membrane. For example, the transmitter 105 and the receiver 106 may be embodied in a single CMUT, and the single CMUT may be configurable into a transmit mode as the transmitter 105 and into a receive mode as the receiver 106.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal (e.g., an acoustical stimulation signal) and transmit the excitation signal to the transmitter 105. The excitation signal is applied across the biased electrodes, causing the flexible membrane to vibrate according to the waveform of the excitation signal and produce a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interact with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113, and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch, with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect, where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104, based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory, to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch event and a no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch event and a no-touch event using a machine learning model. The machine learning model may include and/or may be associated with, for example, a neural network. In some implementations, the sensor circuit 107 uses the machine learning model to distinguish between a touch event and a no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

A touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoidal, Gaussian, or Gaussian derivative) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies, and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided merely as an example. Other examples may differ from what is described with regard to FIG. 1. For example, in some implementations, an array of transmitters, receivers, or transceivers may be provided within the ultrasound chamber 103 of the ultrasonic touch sensor 100. In some implementations, the touch structure 102 may include multiple layers, resulting in more than two ultrasound reflections or echoes. In some implementations, additional circuit components may be added without deviating from the disclosure provided above.

Figure 2:
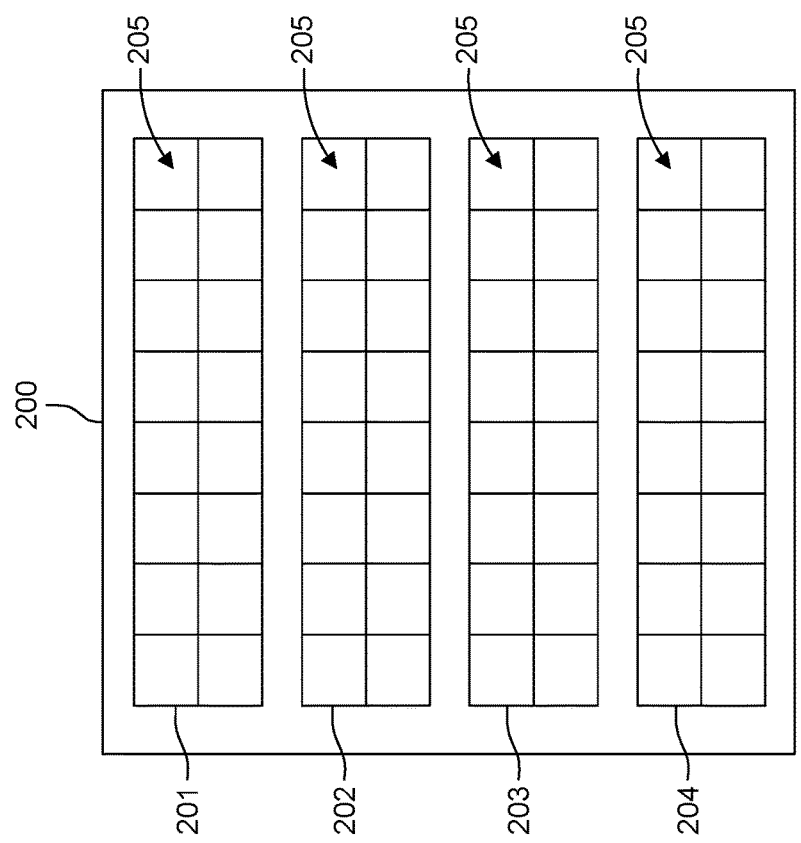
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each include a subset of transceiver transducers 205. Individual transceiver transducers 205 of the array of transceiver transducers 200 are configurable as transmitters, receivers, or transceivers. Additionally, the individual transceiver transducers 205 of the array of transceiver transducers 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision. Thus, the transmitter 105 and the receiver 106 may be transceiver transducers 205 configured as a transmitter and a receiver, respectively.

This configurability may be set on an individual basis (transducer-by-transducer), on a sub-array basis, or on some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array of transceiver transducers 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but may combine in front of the array of transceiver transducers 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe include transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array of transceiver transducers 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 or the operating modes of the transceiver transducers 205.

As indicated above, FIG. 2 is provided as an example. Other examples may differ from what is described with regard to FIG. 2. In some implementations, additional circuit components may be added without deviating from the disclosure provided above.

Figure 3:
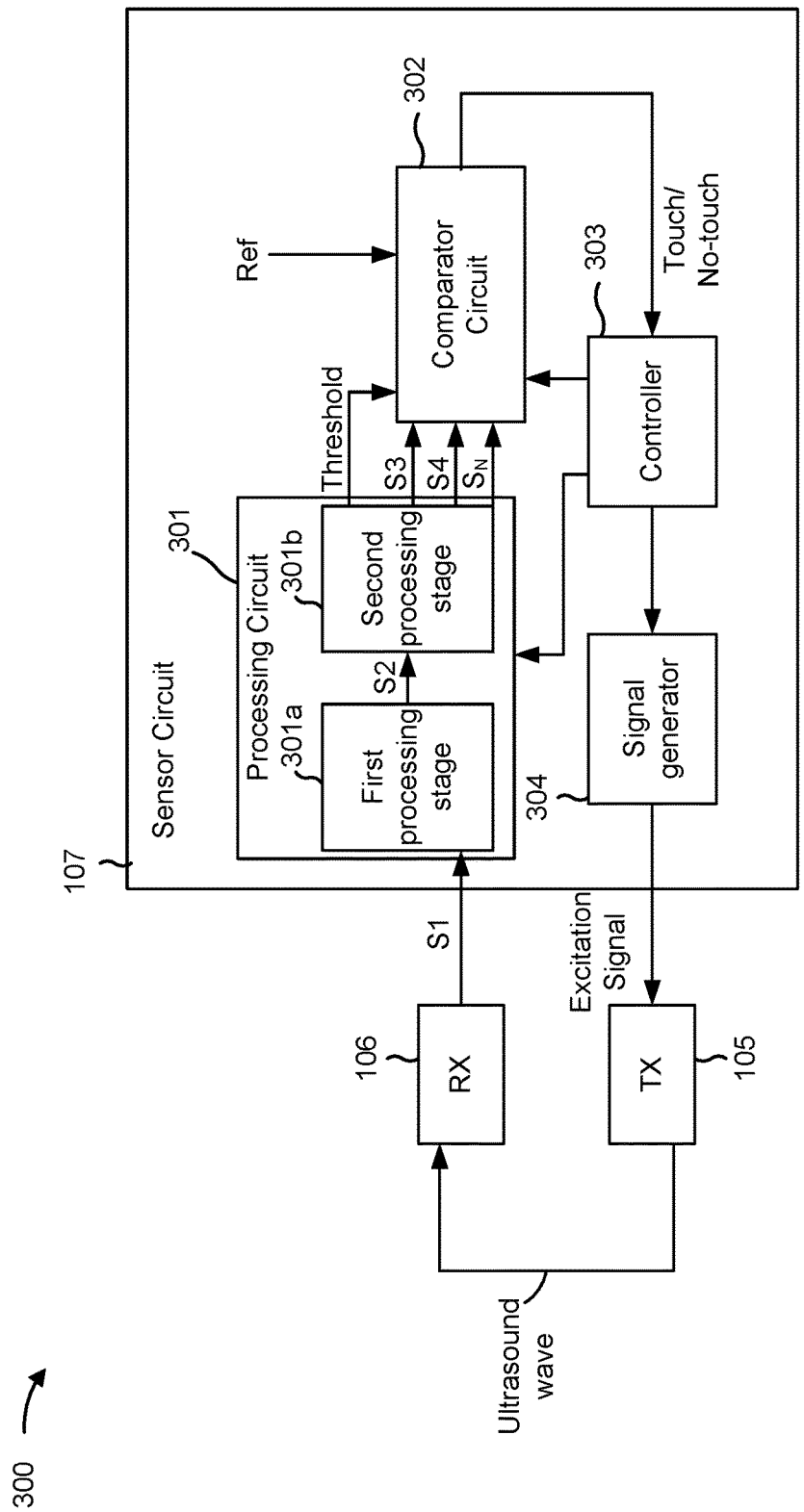
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105.

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of one or more ultrasonic reflected waves, which may be evaluated during a corresponding observation window. For example, the receiver 106 may receive ultrasonic reflected waves produced by a plurality of reflections of the at least one ultrasonic transmit wave and generate the measurement signal S1 representative of the ultrasonic reflected waves. The measurement signal S1 may be a continuous, analog signal generated over one or more excitation frames.

The processing circuit 301 may include a first processing stage 301*a* and a second processing stage 301*b*. The first processing stage 301*a* may be implemented by a first processor and/or a first processing circuit (e.g., a first signal processor) and the second processing stage 301*b* may be implemented by a second processor and/or a second processing circuit (e.g., a second signal processor). Alternatively, the first processing stage 301*a* and the second processing stage 301*b* may be implemented by a same processor and/or a same processing circuit that has different processing functions allocated to the first processing stage 301*a* and the second processing stage 301*b*, respectively.

The first processing stage 301*a* is configured to process the measurement signal S1 in order to determine a feature of the measurement signal S1 and generate a processed measurement signal S2 having a measured value based on the feature of the measurement signal S1. The processed measurement signal S2 may be continuously output based on the measurement signal S1. In some implementations, the first processing stage 301*a* may be configured to evaluate the feature of the measurement signal S1 in order to generate the processed measurement signal S2 that is representative of the feature of the measurement signal S1. The first processing stage 301*a* may include an analog processing circuit that operates in an analog domain, a digital processing circuit that operates in a digital domain, or both the analog processing circuit and the digital processing circuit, for evaluating the feature of the measurement signal S1 and for generating the processed measurement signal S2. Thus, measured values of the processed measurement signal S2 may be an analog value or a digital value.

The first processing stage 301*a* may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and provide a measured value of the processed measurement signal S2 from one or more of the multiple digital samples.

In some implementations, the first processing stage 301*a* may be configured to measure a function of an amplitude of the measurement signal S1 during the corresponding observation window to generate a measured value of the processed measurement signal S2. For example, a measured value of the processed measurement signal S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the first processing stage 301*a* may be configured to calculate a distance of the measurement signal S1 relative to the reference signal during the corresponding observation window to generate a measured value of the processed measurement signal S2. For example, the first processing stage 301*a* may calculate a Euclidean distance between the measurement signal S1 and the reference signal as a measured value of the processed measurement signal S2, a squared Euclidian distance between the measurement signal S1 and the reference signal as the measured value, a Chebyshev distance between the measurement signal S1 and the reference signal as the measured value, a Manhattan distance between the measurement signal S1 and the reference signal as the measured value, or a Minkowski distance between the measurement signal S1 and the reference signal as the measured value.

The second processing stage 301*b* may acquire samples of the measured values of the processed measurement signal S2 and may configure the sensor circuit 107 (e.g., the measurement circuit) into one of at least two operation modes based on the samples of the measured values. For example, the second processing stage 301*b* may configure the sensor circuit 107 into a first operation mode corresponding to an air environment (e.g., corresponding to a dry touch surface) or into a second operation mode corresponding to a wet environment (e.g., corresponding to a wet touch surface).

For example, the second processing stage 301*b* may acquire a first plurality of samples of the processed measurement signal S2, calculate a rate of change of the first plurality of samples, perform a first comparison based on the rate of change and a rate of change threshold, and configure the sensor circuit 107 into one of the first operation mode or the second operation mode based on the rate of change satisfying the rate of change threshold. For example, the second processing stage 301*b* may configure the measurement circuit into the first operation mode if the rate of change does not satisfy the rate of change threshold (e.g., if the rate of change is less than the rate of change threshold), and may configure the measurement circuit in the second operation mode if the rate of change does satisfy the rate of change threshold (e.g., if the rate of change is equal to or greater than the rate of change threshold). Thus, the measurement circuit may be configured to operate in the second operation mode based on the rate of change satisfying the rate of change threshold, and may be configured to operate in the first operation mode based on the rate of change not satisfying the rate of change threshold.

Each sample of the first plurality of samples may be a digital sample that corresponds to a different measured value of the processed measurement signal S2. Thus, each sample of the first plurality of samples may be a distance value, such as a Euclidean distance value, a squared Euclidean distance value, a Chebyshev distance value, a Manhattan distance value, or a Minkowski distance value. The first plurality of samples may include a predetermined number of samples. In addition, the rate of change may correspond to a slope of the first plurality of samples. Thus, the rate of change may correspond to a change in a signal amplitude of the reflected ultrasonic waves measured by the first processing stage 301a. In some implementations, the first plurality of samples may be samples of the measurement signal S1.

In some implementations, the second processing stage 301b may continuously acquire the first plurality of samples on a rolling basis, continuously calculate the rate of change on the rolling basis, and perform the first comparison on the rolling basis. For example, the second processing stage 301b may acquire the first plurality of samples on a rolling basis, calculate a rolling average of the first plurality of samples, subtract the rolling average from a most-recent sample of the first plurality of samples to generate a rate of change value, perform the first comparison based on the rate of change value and the rate of change threshold, and enter into the second operation mode based on the rate of change value satisfying the rate of change threshold.

In some implementations, the second processing stage 301b may compare the processed measurement signal S2 to a first detection threshold, and perform the first comparison each instance that the processed measurement signal S2 satisfies the first detection threshold. In other words, when operating in the first operation mode, the second processing stage 301b may initiate the first comparison only when the processed measurement signal S2 satisfies the first detection threshold. For example, the second processing stage 301b may acquire the first plurality of samples on a rolling basis, compare each sample of the first plurality of samples to a first detection threshold, and perform the first comparison for each instance that a sample of the first plurality of samples satisfies the first detection threshold. Thus, when operating in the first operation mode, the second processing stage 301b may initiate the first comparison based on the predetermined number of samples only when one of the samples satisfies the first detection threshold.

The second processing stage 301b may be configured to set one or more parameters used by the comparator circuit 302 for making touch/no-touch decisions. For example, the second processing stage 301b may configure a detection threshold used by the comparator circuit 302 for making touch/no-touch decisions to different threshold values depending on whether the measurement circuit is configured in the first operation mode or the second operation mode. The second processing stage 301b may set a threshold value of the comparator circuit 302 to the first detection threshold, or to some other detection threshold, when the measurement circuit is operating in the first operation mode, and may set the threshold value of the comparator circuit 302 to a second detection threshold when the measurement circuit is operating in the second operation mode. The second detection threshold may be greater than the first detection threshold.

In addition, the second processing stage 301b may provide a second plurality of samples S3 of the processed measurement signal S2 to the comparator circuit 302. The second plurality of samples S3 may be a defined subset of measured values taken from the processed measurement signal S2. The second plurality of samples S3 may correspond to samples of the measurement signal S1 acquired during a first observation window (e.g., a first time period) that corresponds to a reflection of a corresponding ultrasonic transmit wave (e.g., ultrasonic transmit wave 112) produced at the second interface 111. In other words, the second plurality of samples S3 may correspond to a time interval during which the ultrasonic reflected wave 114 is expected to be received by the receiver 106. Thus, the second plurality of samples S3 may correspond to samples of the ultrasonic reflected wave 114. In some implementations, the second processing stage 301b may forward the processed measurement signal S2 to the comparator circuit 302 with information defining the first observation window. In some implementations, the second plurality of samples may be samples of the measurement signal S1.

In addition, the second processing stage 301b may provide a third plurality of samples S4 of the processed measurement signal S2 to the comparator circuit 302. The third plurality of samples S4 may be a defined subset of measured values taken from the processed measurement signal S2. The third plurality of samples S4 may correspond to samples of the measurement signal S1 acquired during a second observation window (e.g., a second time period) that is subsequent in time to the first observation window. For example, the third plurality of samples S4 may correspond to one or more reflections of the corresponding ultrasonic transmit wave (e.g., ultrasonic transmit wave 112) that are produced after the ultrasonic reflected wave 114. For example, the third plurality of samples S4 may correspond to water reflections if water is present on the touch surface 104. In some implementations, the second processing stage 301b may forward the processed measurement signal S2 to the comparator circuit 302 with information defining the second observation window. In some implementations, the third plurality of samples may be samples of the measurement signal S1. The first observation window and the second observation window may be time intervals within a same measurement frame or a same excitation frame of the corresponding ultrasonic transmit wave. The third plurality of samples S4 may be used for making a touch/no-touch decision and/or to validate or invalidate an initial detection of a touch event when the measurement is configured in the first operation mode.

In addition, the second processing stage 301b may provide one or more additional sets of samples of the processed measurement signal S2 (e.g., a third, a fourth, a fifth, or an Nth plurality of samples $S_N$) to the comparator circuit 302, with each set corresponding to a different observation window of the same measurement frame. In some implementations, a next, subsequent observation window may partially overlap with a previous observation window. For example, a third observation window may be shifted later in time relative to the second observation window. The third observation window may partially overlap with the second observation window such that some of the samples corresponding to the third observation window also correspond to the second observation window. In some implementations, the second processing stage 301b may forward the processed measurement signal S2 to the comparator circuit 302 with information defining the one or more additional observation windows for defining a corresponding set (plurality) of samples. The one or more additional sets of samples may be used for making a touch/no-touch decision and/or to validate or invalidate an initial detection of a touch event when the measurement is configured in the first operation mode.

The comparator circuit 302 may be configured to perform a comparison of samples acquired from the processed measurement signal S2 with a threshold (e.g., the first detection threshold or the second detection threshold) and determine whether a no-touch event or a touch event has occurred at the touch surface 104 based on whether the processed measurement signal S2 satisfies the threshold.

In some implementations, the comparator circuit 302 may compare the measured values of the processed measurement signal S2 provided by the second processing stage 301b to the threshold, detect the no-touch event when a measured value of the processed measurement signal S2 does not satisfy the threshold (e.g., the measured value is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less than the threshold, or the measured value S2 satisfies another condition relative to the threshold).

In some implementations, the comparator circuit 302 may detect the no-touch event when a difference between a measured value of the processed measurement signal S2 and a reference value Ref does not satisfy the threshold (e.g., the difference is equal to or less than the threshold, the difference is less the threshold, or the difference satisfies another condition relative to the threshold), and detect the touch event when the difference between the measured value of the processed measurement signal S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value of the processed measurement signal S2 and the reference value Ref for performing a comparison of the difference with the threshold for generating a comparison result.

If the first processing stage 301a calculates the measured values of the processed measurement signal S2 as the distance of the measurement signal S1 relative to the reference signal (e.g., a Euclidean distance), the comparator circuit 302 may be configured to detect the no-touch event when a measured value of the processed measurement signal S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 may be configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

In some implementations, the comparator circuit 302 may use the first detection threshold as the threshold while configured in the first operation mode (e.g., dry detection mode), and may use the second detection threshold as the threshold while configured in the second operation mode (e.g., wet detection mode). When the measured values of the processed measurement signal S2 are distance values, the second detection threshold may be greater than the first detection threshold.

While configured in the first operation mode, the comparator circuit 302 may perform a second comparison based on the processed measurement signal S2 and the first detection threshold, and determine whether a no-touch event or a touch event has occurred at the touch surface 104 based on whether the processed measurement signal S2 satisfies the first detection threshold. While configured in the second operation mode, the comparator circuit 302 may perform a third comparison based on the processed measurement signal S2 and the second detection threshold, and determine whether the no-touch event or the touch event has occurred at the touch surface 104 based on whether the measurement signal satisfies the second detection threshold.

The comparator circuit 302 may acquire the second plurality of samples S3 of the processed measurement signal S2 during the first observation window that corresponds to a reflection of a corresponding ultrasonic transmit wave produced at the second interface 111. The second plurality of samples S3 may correspond to a time interval during which the ultrasonic reflected wave 114 is expected to be received by the receiver 106. Thus, the second plurality of samples S3 may correspond to samples of the ultrasonic reflected wave 114. While configured in the first operation mode, the comparator circuit 302 may perform the second comparison based on the second plurality of samples S3 and determine whether the no-touch event or the touch event has occurred at the touch surface based on whether the second plurality of samples S3 satisfies the first detection threshold. For example, while configured in the first operation mode, the comparator circuit 302 may determine that the touch event has occurred when any of the second plurality of samples S3 satisfy the first detection threshold. While configured in the second operation mode, the comparator circuit 302 may perform the third comparison based on the second plurality of samples S3 and determine whether the no-touch event or the touch event has occurred at the touch surface based on whether the second plurality of samples S3 satisfies the second detection threshold. For example, while configured in the second operation mode, the comparator circuit 302 may determine that the touch event has occurred when any of the second plurality of samples S3 satisfy the second detection threshold. Thus, a detection of a rapid transition by the second processing stage 301b may be used to detect water on the touch surface, and trigger a switch from the first operation mode to the second operation mode so that the comparator circuit 302 can make a reliable touch/no-touch decision based on whether the touch surface is dry or wet.

In addition, while configured in the first operation mode, the comparator circuit 302 may acquire the third plurality of samples S4 corresponding to the second observation window that is subsequent in time to the first observation window, and validate or invalidate an initial detection of the touch event based on the third plurality of samples S4. For example, the comparator circuit 302 may compare the third plurality of samples S4 to a validation threshold, and validate the initial detection based on the third plurality of samples S4 satisfying the validation threshold, or invalidate the initial detection based on the third plurality of samples S4 not satisfying the validation threshold.

For example, there may be instances when water contact, such as a water droplet, on the touch surface 104 does not cause a rapid transition in a monitored signal. In this case, the sensor circuit 107 may remain in the first operation mode despite water being present on the touch surface 104. Thus, after detecting a touch event, the measurement circuit may perform a validation step to validate whether this initial detection of the touch event is a true touch detection or a false touch detection. For example, if water is present on the touch surface 104 during a no-touch event (e.g., a touch event has not actually occurred), large secondary reflections may be received by the receiver 106 as a result of the water being present on the touch surface 104. These large secondary reflections may be received after ultrasonic reflected wave 114 is received by the receiver 106. In contrast, if water is not present on the touch surface 104 during no-touch event, small secondary reflections may be received by the receiver 106 after ultrasonic reflected wave 114 is received. Moreover, if a touch is made while water is not present on the touch surface 104 (e.g., during the first operation mode), a signal amplitude of the measurement signal S1 during the second observation window may be much lower than a signal amplitude of the measurement signal S1 during a no-touch event that occurs with water present during the second observation window. Thus, there is enough separation in signal amplitudes during the second observation window to discriminate between an instance in which a touch has occurred while the touch surface is dry and an instance in which a no-touch has occurred while the touch surface is wet. In other words, the comparator circuit 302 may use the third plurality of samples S4 to detect a presence of water after a touch has been detected during the first operation mode. If the comparator circuit 302 detects, based on the third plurality of samples S4, that water is present on the touch surface 104, the comparator circuit 302 may invalidate the initial detection of the touch event as being a false touch detection.

In some implementations, the comparator circuit 302 may validate the initial detection based on all of the third plurality of samples S4 being less than the validation threshold, and may invalidate the initial detection based on one or more of the third plurality of samples S4 being equal to or greater than the validation threshold. For example, if a Euclidean distance of the measurement signal S1 during the second observation window satisfies the validation threshold, by being less than the validation threshold, the touch may be validated. On the other hand, if a Euclidean distance of the measurement signal S1 during the second observation window does not satisfy the validation threshold, by being equal to or greater than the validation threshold, the touch may be invalidated.

In some implementations, the second observation window may be static or fixed relative to the first observation window. In some implementations, the second observation window may be a sliding window that is shifted later in time one or more times. By shifting the second observation window to, for example, correspond to the third observation window, the fourth observation window, and the fifth observation window, the samples of the measurement signal S1 or the processed measurement signal S2 may be scanned for water detection. Each of the observation windows used for evaluating the secondary reflections may partially overlap with an adjacent observation window. Thus, after each touch detection (e.g., a sensor output going over the first detection threshold), the measurement circuit may perform a search for additional water interfaces in order to validate or invalidate the initial detection of the touch event.

As indicated above, FIG. 3 is provided as an example. Other examples may differ from what is described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in a touch environment. Such a configuration would provide the ultrasonic touch sensor 300 flexibility to accommodate different types of touch structures, different types of touch gestures, and/or different types of touch environments.

Figure 4:
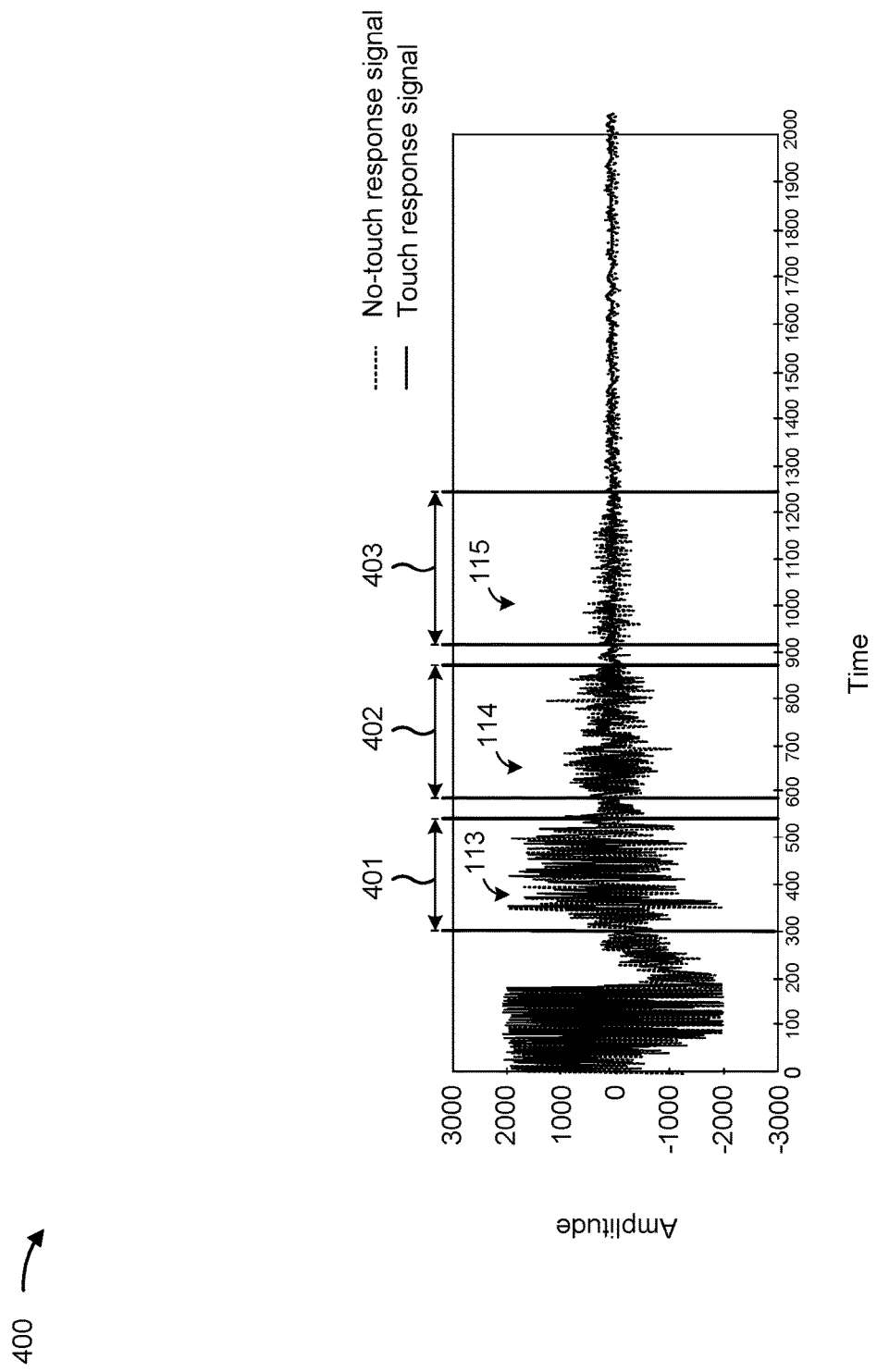
FIG. 4 illustrates a waveform diagram, including a no-touch response signal and a touch response signal, according to one or more implementations.

FIG. 4 illustrates a waveform diagram 400, including a no-touch response signal and a touch response signal, according to one or more implementations. The no-touch response signal is representative of ultrasonic reflected waves produced by reflection of a single ultrasonic transmit wave (e.g., the ultrasonic transmit wave 112) during a no-touch event and received by the receiver 106. In some implementations, a no-touch response signal recorded while configuring an ultrasonic touch sensor (e.g., during a calibration operation) may be used as a reference signal for making touch/no-touch decisions. The touch response signal is representative of ultrasonic reflected waves produced by reflection of a single ultrasonic transmit wave (e.g., the ultrasonic transmit wave 112) during a touch event and received by the receiver 106. Both the no-touch response signal and the touch response signal may be processed by the sensor circuit 107 as measurement signals (e.g., raw data). Thus, the waveform diagram 400 may illustrate a single excitation frame.

The ultrasonic reflected waves produced by reflection may include ultrasonic reflected waves 113 and 114. In addition, the ultrasonic reflected waves produced by reflection may include secondary reflections 115 produced by, for example, the second interface 111 due to multiple internal reflections within the touch structure 102. Accordingly, the secondary reflections 115 may be received by the receiver 106 after being reflected back by the second interface 111.

The ultrasonic reflected wave 113 may be received by the receiver 106 during a calibration observation window 401. Thus, the calibration observation window 401 is a time interval during which the ultrasonic reflected wave 113 corresponding to the ultrasonic transmit wave 112 is expected to be received by the receiver 106. The calibration observation window 401 may be configured based on time-of-flight. As a result, the calibration observation window 401 may be predetermined for each excitation frame. The sensor circuit 107 may be configured to sample a response signal (e.g., a measurement signal) during the calibration observation window 401 to measure and evaluate the ultrasonic reflected wave 113.

As noted above, the acoustic impedance change resulting from the touch event may be minimal at the first interface 110. As a result, the acoustic impedance change may not cause a measurable change in a property of the ultrasonic reflected wave 113. Thus, during the calibration observation window 401, the no-touch response signal and the touch response signal may be substantially similar to each other. While the ultrasonic reflected wave 113 may not be useful for making a touch/no-touch decision, the ultrasonic reflected wave 113 may be useful for calibrating the ultrasonic touch sensor.

The ultrasonic reflected wave 114 may be received by the receiver 106 during a first observation window 402. Thus, the first observation window 402 is a time interval during which the ultrasonic reflected wave 114 corresponding to the ultrasonic transmit wave 112 is expected to be received by the receiver 106. The first observation window 402 may be configured based on the principle of time-of-flight. As a result, the first observation window 402 may be predetermined for each excitation frame. The sensor circuit 107 may be configured to sample a response signal (e.g., a measurement signal) during the first observation window 402 to measure and evaluate the ultrasonic reflected wave 114.

During the first observation window 402, there may be a measurable amplitude change between the no-touch response signal and the touch response signal that can be evaluated by the sensor circuit 107 for making a touch/no-touch decision. For example, an amplitude of the ultrasonic reflected wave 114 may be reduced during a touch event in comparison to a no-touch event. The sensor circuit 107 may be configured to detect a reduction in amplitude of the touch response signal during the first observation window 402, to detect a touch. In addition, the ultrasonic reflected wave 114 may be useful for calibrating the ultrasonic touch sensor.

The secondary reflections 115 may be received by the receiver 106 during a second observation window 403. Thus, the second observation window 403 is a time interval during which the secondary reflections 115 corresponding to the ultrasonic transmit wave 112 are expected to be received by the receiver 106. The second observation window 403 may be configured based on the principle of time-of-flight. As a result, the second observation window 403 may be predetermined for each excitation frame. The sensor circuit 107 may be configured to sample a response signal (e.g., a measurement signal) during the second observation window 403 to measure and evaluate the secondary reflections 115. The secondary reflections 115 may be useful for calibrating the ultrasonic touch sensor. Furthermore, in some implementations, the secondary reflections 115 may be used by the sensor circuit 107 for making a touch/no-touch decision (e.g., a validation decision). For example, the comparator circuit 302 may acquire the third plurality of samples S4 corresponding to the second observation window that is subsequent in time to the first observation window, and validate or invalidate the initial detection of the touch event based on the third plurality of samples S4.

As indicated above, FIG. 4 is provided as an example. Other examples may differ from what is described with regard to FIG. 4.

Figure 5:
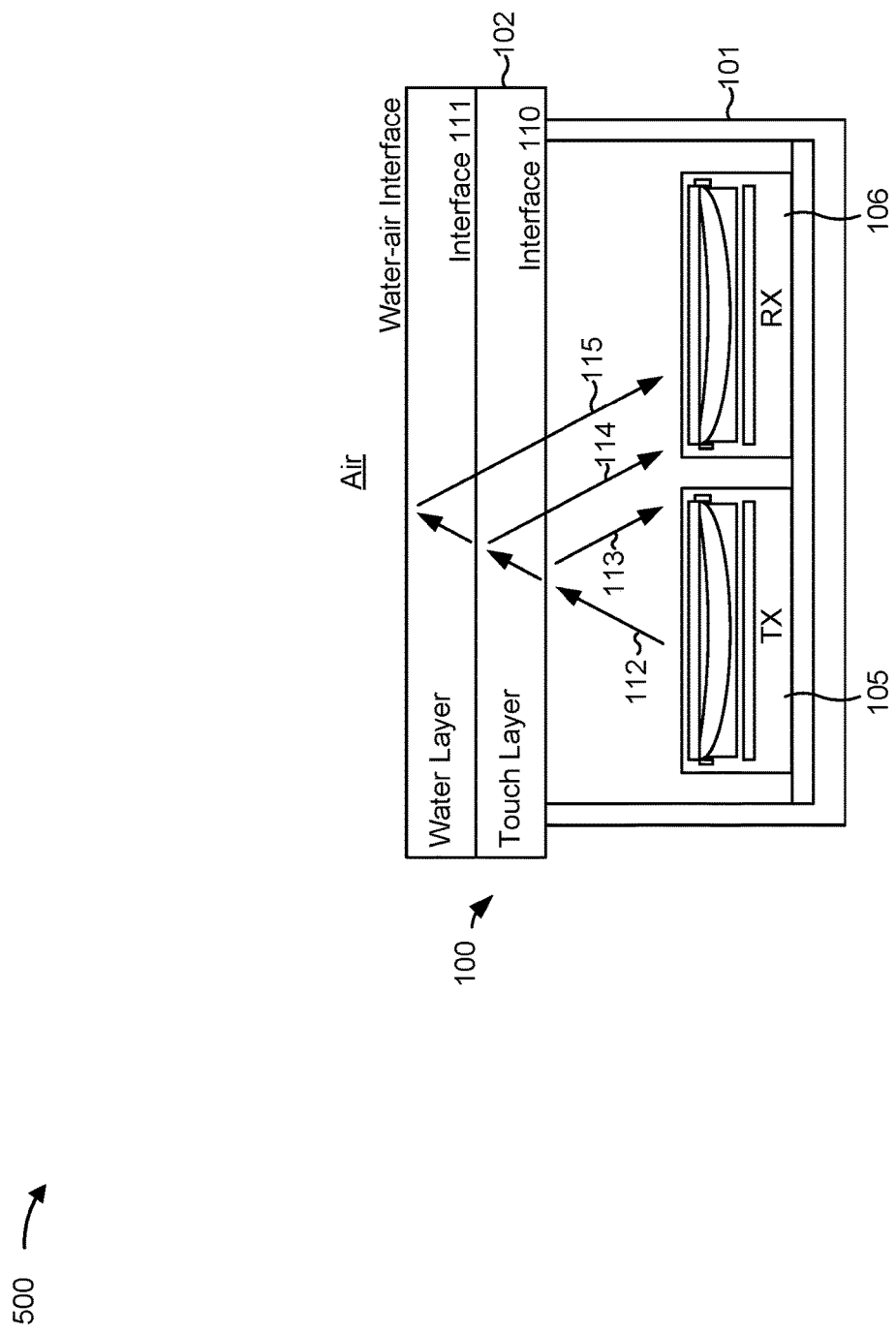
FIG. 5 illustrates a diagram of a touch sensor with a water layer formed at a touch surface of the touch sensor.

FIG. 5 illustrates a diagram 500 of a touch sensor with a water layer formed at a touch surface of the touch sensor. The touch sensor may be similar to the ultrasonic touch sensor 100 described in connection with FIG. 1. The water layer forms an additional interface (e.g., a water-air interface) on top of the second interface 111 (e.g., the touch interface). The water-air interface may produce additional reflections (e.g., secondary reflections 115). For example, the water-air interface may receive a portion of the ultrasonic transmit wave 112, and reflect a portion of the ultrasonic transmit wave 112 as a secondary reflection back into the ultrasound chamber 103 at the receiver 106. Thus, the water-air interface may behave as a third interface for the ultrasonic transmit wave 112, and the additional reflection of the ultrasonic transmit wave 112 at the water-air interface may be sensed at the receiver 106.

In addition, the one or more ultrasonic waves may bounce between the second interface 111 and the water-air interface. Each ultrasonic wave reflected by the water-air interface may be reflected back into the ultrasound chamber 103 at the receiver 106 as a secondary reflection. Thus, the water-air interface may behave as a fourth interface for additional secondary reflections that occur between the second interface 111 and the water-air interface. The additional secondary reflections caused by the presence of the water-air interface may be sensed at the receiver 106.

These additional reflections contain additional information regarding a presence of water, but the additional information is distributed between multiple interfaces (e.g., an initial reflection at the water-air interface, followed by additional secondary reflections occurring between the second interface 111 and the water-air interface and/or between the first interface 110 and the water-air interface). The additional reflections are visible in the measurement signal. In addition, slight changes of the water layer may translate into significant and variable changes of the water-air interface and the secondary reflections produced by the water-air interface.

As indicated above, FIG. 5 is provided as an example. Other examples may differ from what is described with regard to FIG. 5.

Figure 6:
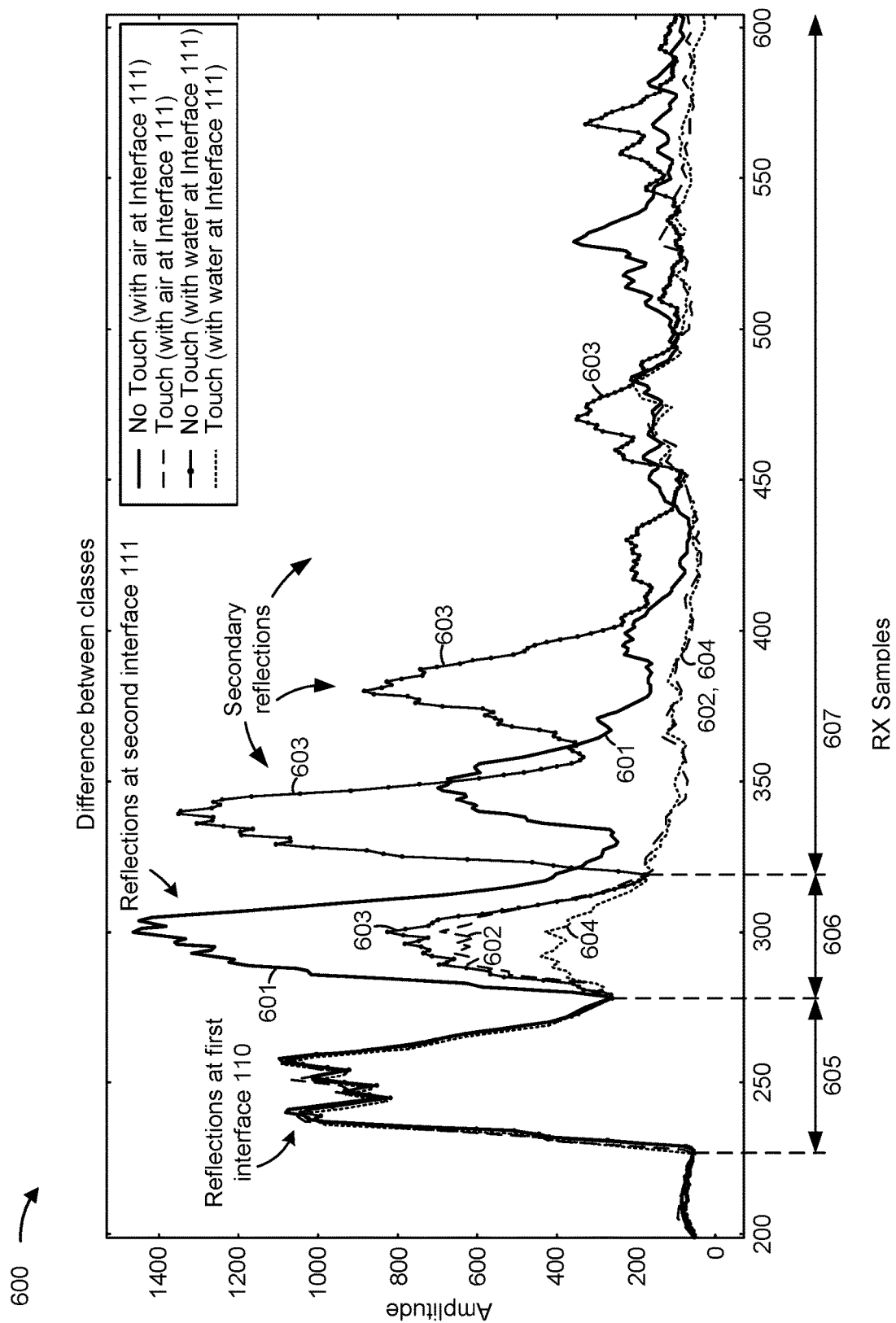
FIG. 6 illustrates a waveform diagram according to one or more implementations.

FIG. 6 illustrates a waveform diagram 600 according to one or more implementations. The waveform diagram 600 includes a no-touch response signal 601 with air present at the second interface 111 (e.g., at the touch surface 104), a touch response signal 602 with air present at the second interface 111, a no-touch response signal 603 with water present at the second interface 111, and a touch response signal 604 with water present at the second interface 111. The water present at the second interface 111 may be due to the touch surface 104 being submerged under water. The no-touch response signals 601 and 603 may be representative of an envelope of ultrasonic reflected waves produced by reflection of a respective ultrasonic transmit wave (e.g., the ultrasonic transmit wave 112) during a no-touch event and received by the receiver 106. The touch response signals 602 and 604 may be representative of an envelope of ultrasonic reflected waves produced by reflection of a respective ultrasonic transmit wave (e.g., the ultrasonic transmit wave 112) during a touch event and received by the receiver 106. In some implementations, the no-touch response signal 601 may be recorded while configuring an ultrasonic touch sensor (e.g., during a calibration operation) and may be used as a reference signal for making touch/no-touch decisions. The no-touch response signals 601 and 603 and the touch response signals 602 and 604 may be processed by the sensor circuit 107 as measurement signals (e.g., raw data). Thus, the waveform diagram 600 may illustrate a single excitation frame.

In addition, the waveform diagram 600 indicates various reflections at various interfaces of the ultrasonic touch sensor 300, including reflections produced at the first interface 110, reflections produced at the second interface 111, and secondary reflections. The reflections produced at the first interface 110, corresponding to the ultrasonic reflected wave 113, may be observed during a calibration observation window 605, during which the reflections from the first interface 110 are expected to be received by the receiver 106 (e.g., based on a time-of-flight principle).

The reflections produced at the second interface 111, corresponding to the ultrasonic reflected wave 114, may be observed during a first observation window 606, during which the reflections from the second interface 111 are expected to be received by the receiver 106 (e.g., based on a time-of-flight principle). The secondary reflections may be produced by the second interface 111 due to multiple internal reflections within the touch structure 102, and/or may be produced by reflection at a water-air interface. Accordingly, the secondary reflections may be received by the receiver 106 after being reflected back by the second interface 111 and/or a water-air interface. The secondary reflections may be observed during a second observation window 607, during which the secondary reflections from the second interface 111 are expected to be received by the receiver 106.

As noted above, the acoustic impedance change resulting from a touch event may be minimal at the first interface 110. As a result, the acoustic impedance change may not cause a measurable change in a property of the ultrasonic reflected wave 113. Thus, during the calibration observation window 605, the no-touch response signals and the touch response signals may be substantially similar to each other.

During the first observation window 606, there may be a measurable amplitude change between a no-touch response signal and a touch response signal that can be evaluated by the sensor circuit 107 for making a touch/no-touch decision. For example, an amplitude of the ultrasonic reflected wave 114 may be reduced during a touch event in comparison to a no-touch event. For example, in the first observation window 606, the touch response signal 602 has lower amplitude than the no-touch response signal 601. Additionally, in the first observation window 606, the touch response signal 604 has lower amplitude than the no-touch response signal 603. Thus, touch detection thresholding may be used to discriminate between no-touch and touch response signals of a same class (e.g., air response signals or water response signals).

In addition, mode detection thresholding may be used at any point to detect a rapid rate of change in a response signal for configuring the sensor circuit into the first operation mode or the second operation mode. For example, in some implementations, samples corresponding to the first observation window 606 may be used for determining an operation mode of the sensor circuit 107 prior to making a touch/no-touch decision.

In some implementations, the first processing stage 301a may measure a function of an amplitude of the first measurement signal to generate a measured value, detect the no-touch event when the measured value does not satisfy a detection threshold (e.g., the first detection threshold or the second detection threshold), and detect the touch event when the measured value satisfies the detection threshold. The measured value may be a global extremum of the first measurement signal measured within a predetermined measurement interval (e.g., within the first observation window 606), a maximum peak-to-peak amplitude of the first measurement signal measured within the predetermined measurement interval, an average amplitude of the first measurement signal measured within the predetermined measurement interval, or a median amplitude of the first measurement signal measured within the predetermined measurement interval.

In some implementations, the measurement circuit is configured to measure a function of an amplitude of the first measurement signal to generate a measured value, detect the no-touch event when a difference between the measured value and a reference value does not satisfy the detection threshold, and detect the touch event when the difference satisfies the detection threshold.

In some implementations, the measurement circuit is configured to calculate a distance (e.g., Euclidean distance, a squared Euclidian distance, a Chebyshev distance, a Manhattan distance, or a Minkowski distance) of the first measurement signal relative to a reference signal (e.g., the no-touch response signal 601 recorded during a configuring of the ultrasonic touch sensor 300) to generate a measured value, detect the no-touch event when the measured value does not satisfy the detection threshold, and detect the touch event when the measured value satisfies the detection threshold.

In some implementations, the measurement circuit may monitor for a signal change of the measurement signal during a predetermined time interval corresponding to the first ultrasonic reflected wave. The predetermined time interval may correspond to the first observation window 606, or a time interval corresponding to a secondary reflection. For example, during the first observation window 606, there is a significant change between the no-touch response signal 601 and the touch response signal 602. While operating in the first operation mode, the measurement circuit may monitor the measurement signal for a signal change in an air response signal, and determine whether a no-touch event or a touch event has occurred at the touch surface 104 while the touch surface 104 is dry based on whether the signal change is detected during the predetermined time interval (e.g., during the predetermined time interval within the first observation window 606).

In addition, during the first observation window, there is a significant change between the no-touch response signal 603 and the touch response signal 604. While operating in the second operation mode, the measurement circuit may monitor the measurement signal for a signal change in a water response signal, determine whether a no-touch event or a touch event has occurred at the touch surface 104 while the touch surface 104 is wet based on whether the signal change is detected during the predetermined time interval (e.g., during the predetermined time interval within the first observation window 606).

As indicated above, FIG. 6 is provided as an example. Other examples may differ from what is described with regard to FIG. 6.

Figure 7:
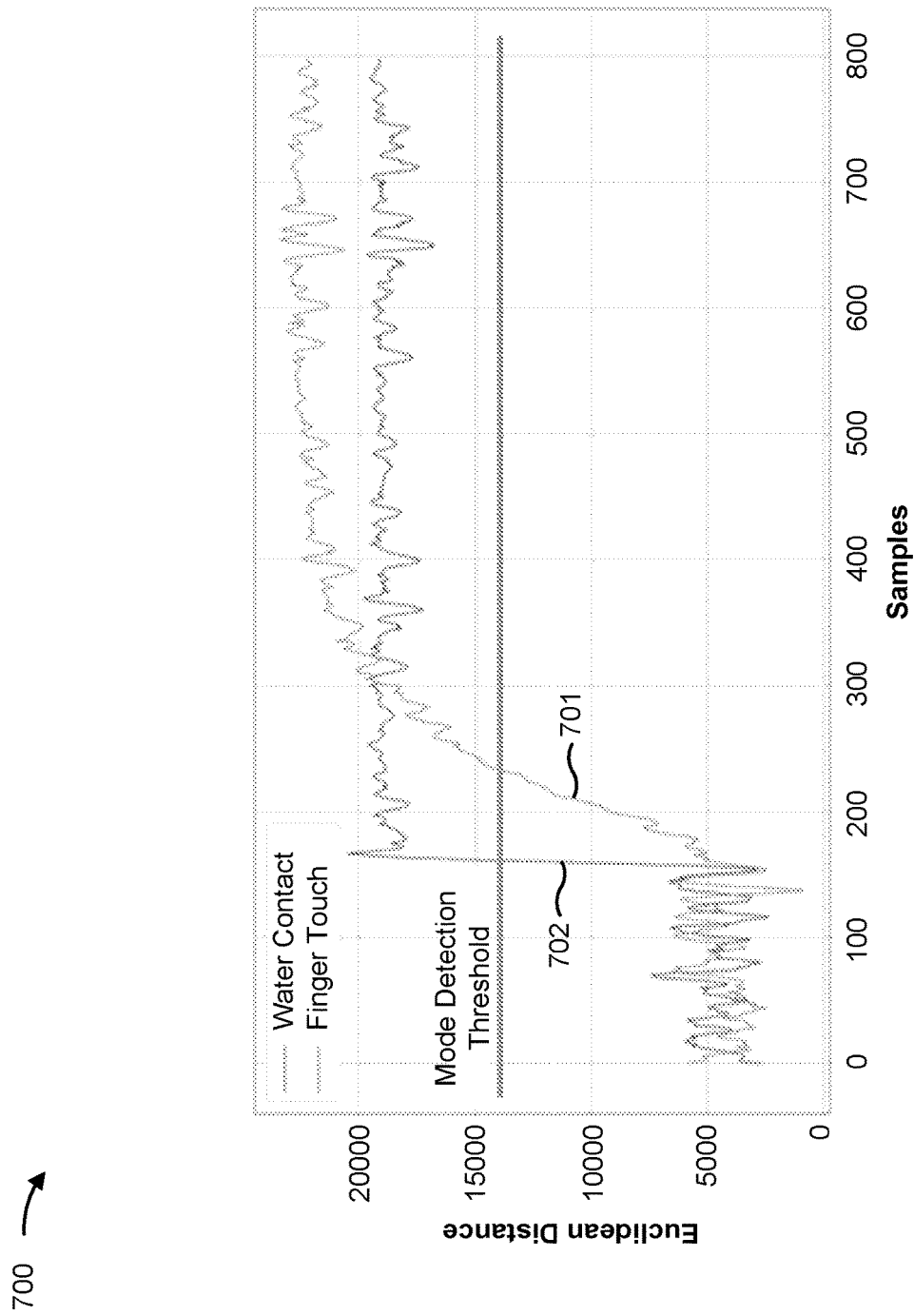
FIG. 7 illustrates a waveform diagram according to one or more implementations.

FIG. 7 illustrates a waveform diagram 700 according to one or more implementations. The waveform diagram 700 includes Euclidean distance response signals (e.g., processed measurement signals S2) related to a water contact and a finger touch at the touch surface 104. The Euclidean distance response signals include a first Euclidean distance response signal 701 that shows a transition that occurs when a finger makes contact with the touch surface 104 in an air-environment (e.g., when the touch surface is dry). Thus, first Euclidean distance response signal 701 corresponds to a transition between a no-touch event and a touch event in the air-environment. The Euclidean distance response signals further include a second Euclidean distance response signal 702 that shows a transition that occurs when water makes contact with the touch surface. A rate of change of the second Euclidean distance response signal 702 is much higher than a rate of change of the first Euclidean distance response signal 701.

The second processing stage 301b of the processing circuit 301 may continuously monitor a predetermined number of most-recent samples of a Euclidean distance response signal, and compute a rolling average of the predetermined number of most-recent samples. Additionally, the second processing stage 301b may continuously compare the Euclidean distance response signal with a mode detection threshold. The mode detection threshold may be the same as the first detection threshold. At every crossing of the mode detection threshold, the second processing stage 301b may compare a rate of change of the Euclidean distance response signal with a rate of change threshold, and operate in the second operation mode based on the rate of change satisfying the rate of change threshold. For example, the second processing stage 301b may subtract the rolling average from a most-recent sample of the predetermined number of most-recent samples to generate a rate of change value, perform the first comparison based on the rate of change value and the rate of change threshold, and enter into the second operation mode based on the rate of change value satisfying the rate of change threshold.

The comparator circuit 302 may use the first detection threshold while configured in the first operation mode (e.g., dry detection mode) for making a touch/no-touch decision, and may use the second detection threshold while configured in the second operation mode (e.g., wet detection mode) for making a touch/no-touch decision.

As indicated above, FIG. 7 is provided as an example. Other examples may differ from what is described with regard to FIG. 7.

Figure 8:
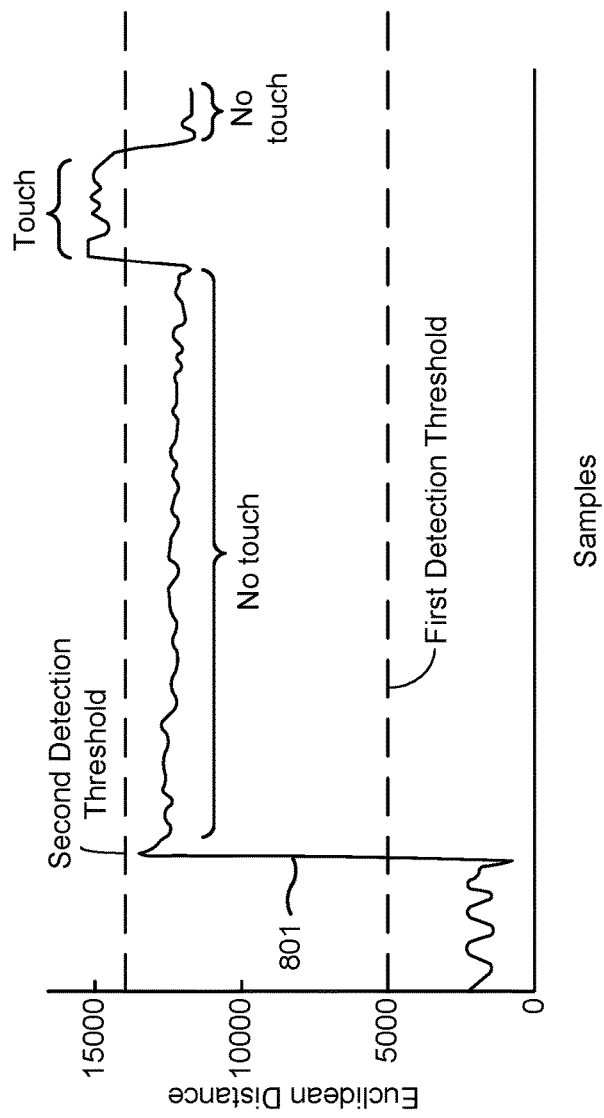
FIG. 8 illustrates a waveform diagram according to one or more implementations.

FIG. 8 illustrates a waveform diagram 800 according to one or more implementations. The waveform diagram 800 includes a Euclidean distance response signal 801 related to a change in operation mode. The Euclidean distance response signal 801 may be the processed measurement signal S2 generated by the first processing stage 301a. The Euclidean distance response signal 801 undergoes a rapid rate of change during an initial water contact at the touch surface. As a result, the second processing stage 301b changes the detection threshold used for making touch/no-touch decisions from the first detection threshold to the second detection threshold. The second detection threshold is set between signal values associated with no-touch events and signal values associated with touch events. Thus, while configured in the second operation mode, the comparator circuit 302 may perform a comparison based on the Euclidean distance response signal 801 and the second detection threshold, and determine whether a no-touch event or a touch event has occurred at the touch surface 104 based on whether the Euclidean distance response signal 801 satisfies the second detection threshold. If the Euclidean distance response signal 801 exceeds the second detection threshold in the second operation mode, a touch may be detected.

Additionally, while configured in the first operation mode, the comparator circuit 302 may perform a comparison based on the Euclidean distance response signal 801 and the first detection threshold, and determine whether a no-touch event or a touch event has occurred at the touch surface 104 based on whether the Euclidean distance response signal 801 satisfies the first detection threshold. If the Euclidean distance response signal 801 exceeds the first detection threshold in the first operation mode, a touch may be detected.

As indicated above, FIG. 8 is provided as an example. Other examples may differ from what is described with regard to FIG. 8.

Figure 9:
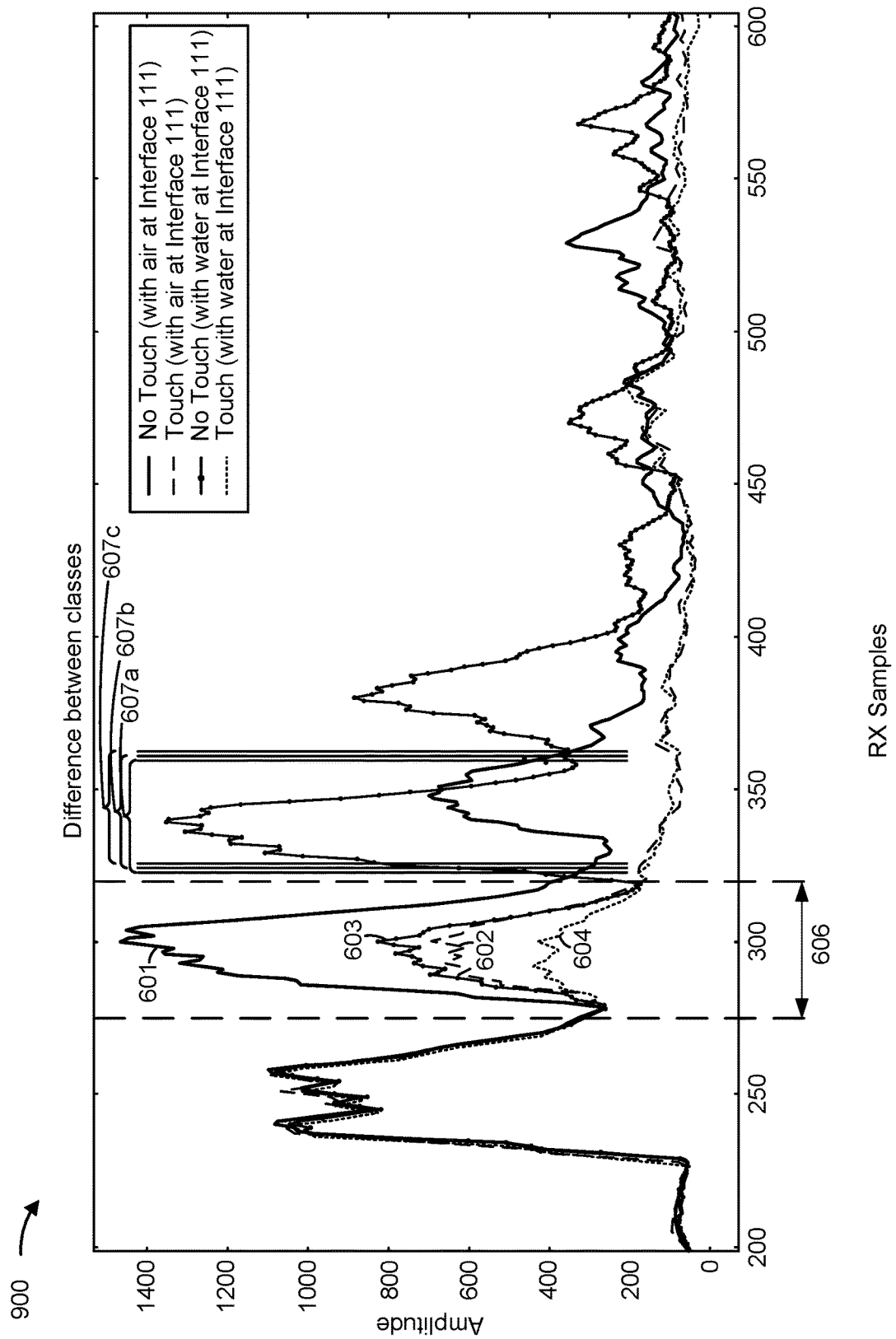
FIG. 9 illustrates a waveform diagram according to one or more implementations.

FIG. 9 illustrates a waveform diagram 900 according to one or more implementations. The waveform diagram 900 includes the no-touch response signal 601 with air present at the second interface, the touch response signal 602 with air present at the second interface 111, the no-touch response signal 603 with water present at the second interface 111, and the touch response signal 604 with water present at the second interface 111. The measurement circuit of the ultrasonic touch sensor 300 may apply a validation algorithm to determine whether a touch detected in the first operation mode is a valid touch. The measurement circuit may use sliding observation windows 607a, 607b, and 607c to validate or invalidate an initial detection of a touch event. The sliding observation windows 607a, 607b, and 607c may be used to evaluate secondary reflections to detect a presence of water on the touch surface 104. The sliding observation windows 607a, 607b, and 607c may correspond to the second observation window, the third observation window, and the fourth observation window, respectively. In some implementations, a single observation window may be used to validate or invalidate the initial detection of the touch event. The single observation window may be one similar to one of the sliding observation windows 607a, 607b, and 607c, or may be wider to capture a longer time interval.

In some implementations, the measurement circuit may start from an end of the first observation window 606, compute a first Euclidean distance using a plurality of samples corresponding to the sliding observation window 607a. The measurement circuit may compute a second Euclidean distance using a plurality of samples corresponding to the sliding observation window 607b. The measurement circuit may compute a third Euclidean distance using a plurality of samples corresponding to the sliding observation window 607c. The measurement circuit may compare each Euclidean distance to a validation threshold, and invalidate the initial decision of the touch event if any of the Euclidean distances satisfy (e.g., exceed) the validation threshold. Alternatively, the measurement circuit may select the highest Euclidean distance among the first, second, and third Euclidean distances, and invalidate the initial decision of the touch event if the highest Euclidean distance satisfies (e.g., exceeds) the validation threshold. The measurement circuit may validate the initial decision of the touch event if the validation threshold is not satisfied.

As indicated above, FIG. 9 is provided as an example. Other examples may differ from what is described with regard to FIG. 9.

The following provides an overview of some Aspects of the present disclosure:

Aspect 1: An ultrasonic touch sensor, comprising: a housing having a package cavity; a touch structure comprising a touch surface configured to receive a touch, wherein the touch structure is coupled to the housing and arranged over the package cavity, and wherein the touch structure comprises a touch interface at the touch surface; an ultrasonic transmitter arranged within the package cavity, wherein the ultrasonic transmitter is configured to transmit at least one ultrasonic transmit wave toward the touch structure; an ultrasonic receiver arranged within the package cavity, wherein the ultrasonic receiver is configured to receive ultrasonic reflected waves produced by a plurality of reflections of the at least one ultrasonic transmit wave and generate a measurement signal representative of the ultrasonic reflected waves; and a measurement circuit arranged within the package cavity and coupled to the ultrasonic receiver, wherein the measurement circuit is configurable in a first operation mode corresponding to an air environment and a second operation mode corresponding to a wet environment, and wherein the measurement circuit is configured to acquire a first plurality of samples of the measurement signal, calculate a rate of change of the first plurality of samples, perform a first comparison based on the rate of change and a rate of change threshold, and operate in the second operation mode based on the rate of change satisfying the rate of change threshold.

Aspect 2: The ultrasonic touch sensor of Aspect 1, wherein the rate of change corresponds to a slope of the first plurality of samples.

Aspect 3: The ultrasonic touch sensor of any of Aspects 1-2, wherein the first plurality of samples is a predetermined number of samples, and wherein the measurement circuit is configured to continuously acquire the first plurality of samples on a rolling basis, continuously calculate the rate of change on the rolling basis, and perform the first comparison on the rolling basis.

Aspect 4: The ultrasonic touch sensor of any of Aspects 1-3, wherein the measurement circuit is configured to acquire the first plurality of samples on a rolling basis, calculate a rolling average of the first plurality of samples, subtract the rolling average from a most-recent sample of the first plurality of samples to generate a rate of change value, perform the first comparison based on the rate of change value and the rate of change threshold, and enter into the second operation mode based on the rate of change value satisfying the rate of change threshold.

Aspect 5: The ultrasonic touch sensor of any of Aspects 1-4, wherein the measurement circuit is configured to acquire the first plurality of samples on a rolling basis, compare each sample of the first plurality of samples to a first detection threshold, and perform the first comparison for each instance that a sample of the first plurality of samples satisfies the first detection threshold.

Aspect 6: The ultrasonic touch sensor of any of Aspects 1-5, wherein the measurement circuit is configured to compare the measurement signal to a first detection threshold, and perform the first comparison each instance the measurement signal satisfies the first detection threshold.

Aspect 7: The ultrasonic touch sensor of any of Aspects 1-6, wherein the first plurality of samples are digital samples, and wherein the measurement circuit is configured to calculate a distance of the measurement signal relative to a reference signal to generate each sample of the first plurality of samples.

Aspect 8: The ultrasonic touch sensor of Aspect 7, wherein the distance is a Euclidean distance, a squared Euclidean distance, a Chebyshev distance, a Manhattan distance, or a Minkowski distance.

Aspect 9: The ultrasonic touch sensor of any of Aspects 1-8, wherein the measurement circuit is configured to operate in the first operation mode based on the rate of change not satisfying the rate of change threshold.

Aspect 10: The ultrasonic touch sensor of Aspect 9, wherein, while configured in the first operation mode, the measurement circuit is configured to perform a second comparison based on the measurement signal and a first detection threshold, and determine whether a no-touch event or a touch event has occurred at the touch surface based on whether the measurement signal satisfies the first detection threshold, wherein, while configured in the second operation mode, the measurement circuit is configured to perform a third comparison based on the measurement signal and a second detection threshold, and determine whether the no-touch event or the touch event has occurred at the touch surface based on whether the measurement signal satisfies the second detection threshold, and wherein the first detection threshold and the second detection threshold are different thresholds.

Aspect 11: The ultrasonic touch sensor of Aspect 10, wherein the second detection threshold is greater than the first detection threshold.

Aspect 12: The ultrasonic touch sensor of Aspect 10, wherein the measurement circuit is configured to acquire a second plurality of samples of the measurement signal during a first observation window that corresponds to a reflection of a corresponding ultrasonic transmit wave produced at the touch interface, while configured in the first operation mode, the measurement circuit is configured to perform the second comparison based on the second plurality of samples and determine whether the no-touch event or the touch event has occurred at the touch surface based on whether the second plurality of samples satisfies the first detection threshold, and while configured in the second operation mode, the measurement circuit is configured to perform the third comparison based on the second plurality of samples and determine whether the no-touch event or the touch event has occurred at the touch surface based on whether the second plurality of samples satisfies the second detection threshold.

Aspect 13: The ultrasonic touch sensor of Aspect 12, wherein the measurement circuit is configured to calculate a distance value of the second plurality of samples relative to a reference signal, and perform the second comparison based on the distance value and the first detection threshold or perform the third comparison based on the distance value and the second detection threshold.

Aspect 14: The ultrasonic touch sensor of Aspect 12, wherein, while configured in the first operation mode, the measurement circuit is configured to acquire a third plurality of samples of the measurement signal during a second observation window that is subsequent in time to the first observation window, and validate or invalidate an initial detection of the touch event based on the third plurality of samples, and wherein the first observation window and the second observation window are time intervals within a measurement frame of the corresponding ultrasonic transmit wave.

Aspect 15: The ultrasonic touch sensor of Aspect 14, wherein the measurement circuit is configured to compare a distance value of the third plurality of samples to a validation threshold, and validate the initial detection based on the distance value satisfying the validation threshold, or invalidate the initial detection based on the distance value not satisfying the validation threshold.

Aspect 16: The ultrasonic touch sensor of any of Aspects 1-15, wherein the ultrasonic transmitter is a first capacitive micromachined ultrasonic transducer (CMUT), and wherein the ultrasonic receiver is a second CMUT.

Aspect 17: The ultrasonic touch sensor of any of Aspects 1-16, wherein the ultrasonic transmitter and the ultrasonic receiver are embodied in a single capacitive micromachined ultrasonic transducer (CMUT), and wherein the single CMUT is configurable into a transmit mode as the ultrasonic transmitter and into a receive mode as the ultrasonic receiver.

Aspect 18: A method of operating an ultrasonic touch sensor, the method comprising: transmitting an ultrasonic transmit wave toward a touch structure of the ultrasonic touch sensor; generating a measurement signal representative of ultrasonic reflected waves produced by a plurality of reflections of the ultrasonic transmit wave; acquiring a plurality of samples of the measurement signal; calculating a rate of change of the plurality of samples; performing a comparison based on the rate of change and a rate of change threshold; and operating the ultrasonic touch sensor in a water operation mode based on the rate of change satisfying the rate of change threshold, or operating the ultrasonic touch sensor in an air operation mode based on the rate of change not satisfying the rate of change threshold.

Aspect 19: The method of Aspect 18, wherein the plurality of samples is a predetermined number of samples acquired on a rolling basis.

Aspect 20: The method of any of Aspects 18-19, further comprising: comparing the measurement signal to a detection threshold; and calculating the rate of change and performing the comparison based on the measurement signal satisfying the detection threshold.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An ultrasonic touch sensor, comprising:
   a housing having a package cavity;

a touch structure comprising a touch surface configured to receive a touch, wherein the touch structure is coupled to the housing and arranged over the package cavity, and wherein the touch structure comprises a touch interface at the touch surface;

an ultrasonic transmitter arranged within the package cavity, wherein the ultrasonic transmitter is configured to transmit at least one ultrasonic transmit wave toward the touch structure;

an ultrasonic receiver arranged within the package cavity, wherein the ultrasonic receiver is configured to receive ultrasonic reflected waves produced by a plurality of reflections of the at least one ultrasonic transmit wave and generate a measurement signal representative of the ultrasonic reflected waves; and a measurement circuit arranged within the package cavity and coupled to the ultrasonic receiver, wherein the measurement circuit is configurable in a first operation mode corresponding to an air environment and a second operation mode corresponding to a wet environment, and wherein the measurement circuit is configured to:

acquire a first plurality of samples of the measurement signal based on calculating a distance of the measurement signal relative to a reference signal to generate the first plurality of samples, calculate a rate of change of the first plurality of samples, perform a first comparison based on the rate of change and a rate of change threshold, and operate in the second operation mode based on the rate of change satisfying the rate of change threshold.

2. The ultrasonic touch sensor of claim 1, wherein the rate of change corresponds to a slope of the first plurality of samples.

3. The ultrasonic touch sensor of claim 1, wherein the first plurality of samples is a predetermined number of samples, and wherein the measurement circuit is configured to continuously acquire the first plurality of samples on a rolling basis, continuously calculate the rate of change on the rolling basis, and perform the first comparison on the rolling basis.

4. The ultrasonic touch sensor of claim 1, wherein the measurement circuit is configured to acquire the first plurality of samples on a rolling basis, calculate a rolling average of the first plurality of samples, subtract the rolling average from a most-recent sample of the first plurality of samples to generate a rate of change value, perform the first comparison based on the rate of change value and the rate of change threshold, and enter into the second operation mode based on the rate of change value satisfying the rate of change threshold.

5. The ultrasonic touch sensor of claim 1, wherein the measurement circuit is configured to acquire the first plurality of samples on a rolling basis, compare each sample of the first plurality of samples to a first detection threshold, and perform the first comparison for each instance that a sample of the first plurality of samples satisfies the first detection threshold.

6. The ultrasonic touch sensor of claim 1, wherein the measurement circuit is configured to compare the measurement signal to a first detection threshold, and perform the first comparison each instance the measurement signal satisfies the first detection threshold.

7. The ultrasonic touch sensor of claim 1, wherein the distance is a Euclidean distance, a squared Euclidean distance, a Chebyshev distance, a Manhattan distance, or a Minkowski distance.

8. The ultrasonic touch sensor of claim 1, wherein the measurement circuit is configured to operate in the first operation mode based on the rate of change not satisfying the rate of change threshold.

9. The ultrasonic touch sensor of claim 8, wherein, while configured in the first operation mode, the measurement circuit is configured to perform a second comparison based on the measurement signal and a first detection threshold, and determine whether a no-touch event or a touch event has occurred at the touch surface based on whether the measurement signal satisfies the first detection threshold, wherein, while configured in the second operation mode, the measurement circuit is configured to perform a third comparison based on the measurement signal and a second detection threshold, and determine whether the no-touch event or the touch event has occurred at the touch surface based on whether the measurement signal satisfies the second detection threshold, and wherein the first detection threshold and the second detection threshold are different thresholds.

10. The ultrasonic touch sensor of claim 9, wherein the second detection threshold is greater than the first detection threshold.

11. The ultrasonic touch sensor of claim 9, wherein the measurement circuit is configured to acquire a second plurality of samples of the measurement signal during a first observation window that corresponds to a reflection of a corresponding ultrasonic transmit wave produced at the touch interface, while configured in the first operation mode, the measurement circuit is configured to perform the second comparison based on the second plurality of samples and determine whether the no-touch event or the touch event has occurred at the touch surface based on whether the second plurality of samples satisfies the first detection threshold, and while configured in the second operation mode, the measurement circuit is configured to perform the third comparison based on the second plurality of samples and determine whether the no-touch event or the touch event has occurred at the touch surface based on whether the second plurality of samples satisfies the second detection threshold.

12. The ultrasonic touch sensor of claim 11, wherein the measurement circuit is configured to calculate a distance value of the second plurality of samples relative to the reference signal, and perform the second comparison based on the distance value and the first detection threshold or perform the third comparison based on the distance value and the second detection threshold.

13. The ultrasonic touch sensor of claim 11, wherein, while configured in the first operation mode, the measurement circuit is configured to acquire a third plurality of samples of the measurement signal during a second observation window that is subsequent in time to the first observation window, and validate or invalidate an initial detection of the touch event based on the third plurality of samples, and wherein the first observation window and the second observation window are time intervals within a measurement frame of the corresponding ultrasonic transmit wave.

14. The ultrasonic touch sensor of claim 13, wherein the measurement circuit is configured to compare a distance value of the third plurality of samples to a validation threshold, and validate the initial detection based on the distance value satisfying the validation threshold, or invalidate the initial detection based on the distance value not satisfying the validation threshold.

15. The ultrasonic touch sensor of claim 1, wherein the ultrasonic transmitter is a first capacitive micromachined ultrasonic transducer (CMUT), and
wherein the ultrasonic receiver is a second CMUT.

16. The ultrasonic touch sensor of claim 1, wherein the ultrasonic transmitter and the ultrasonic receiver are embodied in a single capacitive micromachined ultrasonic transducer (CMUT), and
wherein the single CMUT is configurable into a transmit mode as the ultrasonic transmitter and into a receive mode as the ultrasonic receiver.

17. The ultrasonic touch sensor of claim 1, wherein the first plurality of samples are digital samples.

18. A method of operating an ultrasonic touch sensor, the method comprising:
transmitting an ultrasonic transmit wave toward a touch structure of the ultrasonic touch sensor;
generating a measurement signal representative of ultrasonic reflected waves produced by a plurality of reflections of the ultrasonic transmit wave;
acquiring a plurality of samples of the measurement signal based on calculating a distance of the measurement signal relative to a reference signal to generate the plurality of samples;
calculating a rate of change of the plurality of samples;
performing a comparison based on the rate of change and a rate of change threshold; and
operating the ultrasonic touch sensor in a water operation mode based on the rate of change satisfying the rate of change threshold, or operating the ultrasonic touch sensor in an air operation mode based on the rate of change not satisfying the rate of change threshold.

19. The method of claim 18, wherein the plurality of samples is a predetermined number of samples acquired on a rolling basis.

20. The method of claim 18, further comprising:
comparing the measurement signal to a detection threshold; and
calculating the rate of change and performing the comparison based on the measurement signal satisfying the detection threshold.

* * * * *